Patented Oct. 26, 1943

2,332,815

UNITED STATES PATENT OFFICE 2,332,815

COMPOUNDS OF THE HORMONE SERIES

Leopold Ruzicka, Zurich, Switzerland, assignor, by mesne assignments, to Ciba Pharmaceutical Products, Incorporated, Summit, N. J., a corporation of New Jersey No Drawing. Application January 26, 1938, Serial No. 187,073. In Switzerland February 13, 1937

7 Claims. (Cl. 260—397.3)

Compounds of the hormone series containing a cyclopentanopolyhydrophenanthrene nucleus with a doubly conjugated unsaturated keto-grouping

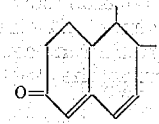

have not been known. This invention relates to the manufacture of such compounds from corresponding compounds having the grouping

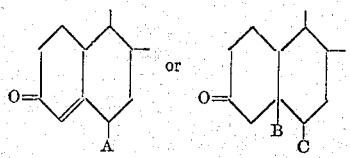

in which A, B and C represent atoms or atom groupings which are easily eliminated in the form of an acid, of water, of an alcohol or the like with formation of double linking, the process of manufacture consisting in causing a suitable eliminating agent to react with the compound until such atom or atom grouping A, B and C has been completely eliminated. A, B and C may be, for instance, halogen, hydroxyl or esterified or etherified hydroxyl. Eliminating agents are, for instance, tertiary bases, salts of fatty acids, silver-nitrate, phosphoric acid or mere application of heat.

Parent materials for the invention may be for example, compounds of the male sexual hormone series, of progesterone or of cortical hormones as well as derivatives of these. The new compounds are applicable in therapeutics.

The following examples illustrate the invention, the parts being of weight:

Example 1

1 part of 6-bromo-$\Delta^4$-androstene-dione-(3,17) of melting point 171° C. is added to 5 parts of absolute pyridine and the whole is boiled for 1 hour in a reflux apparatus. The product is extracted with ether and the ethereal solution is washed with dilute hydrochloric acid and water and is then dried and evaporated. The residue is adsorbed from benzene solution on aluminium oxide and the $\Delta^4,\Delta^6$-androstadiene-dione-(3,17) is obtained by washing with a mixture of benzene and ether (1:1). The new compound may be crystallized from benzine or a mixture of benzine and ethyl acetate for further purification; it melts at 173° C.

Instead of pyridine there may also be used for example quinoline or dimethylaniline.

Example 2

1 part of 6-bromo-testosterone-benzoate of melting point 176° C. is added to 5 parts of absolute pyridine and the whole is boiled under reflux for 1 hour. The solution which is at first clear soon shows a precipitate of sparingly soluble pyridine complex. The mixture is diluted with ether and filtered from the sparingly soluble pyridine complex. The portion insoluble in ether is extracted with boiling methanol and the methanol solution is precipitated by addition of ether. The combined ethereal solutions are washed with dilute hydrochloric acid, sodium carbonate solution and water, and then dried and evaporated. The residue is crystallized from alcohol and from a mixture of ethyl acetate and benzine for purification; it constitutes the $\Delta^6$-dehydro-testosterone-benzoate of melting point 246° C.

Instead of the benzoate there may of course be produced just as well another ester of the 6-dehydro-testosterone.

Example 3

3 parts of 6-bromo-$\Delta^4$-testosterone-propionate (produced for example from $\Delta^5$-androstene-3-trans-diol-17-propionate by bromination and oxidation with aid of chromium trioxide) are boiled for 1 hour in a reflux apparatus with 15 parts of absolute pyridine. A difficultly soluble pyridine complex is formed thereby which after mixing the reaction product with absolute ether is precipitated and filtered. The residue is dissolved hot in little methanol, again precipitated with absolute ether and filtered. The combined ethereal solutions are washed with dilute hydrochloric acid, sodium carbonate solution and water, dried and evaporated. The residue is adsorbed from benzene solution or aluminium oxide and the $\Delta^6$-dehydro-testosterone-propionate is washed by means of benzene and benzene-ether (1:1). The new compound is purified by recrystallization from benzine and melts at 134° C. By saponifying this ester there is obtained free 6-dehydro-testosterone.

The elimination of hydrogen bromide can also be carried out for example with aid of a fatty acid salt such as potassium acetate.

Example 4

0.1 part of 6-bromo-$\Delta^4$-pregnene-dione-(3,20) is dissolved in 1.5 parts of dry pyridine and heated for some time to boiling. The solution is then evaporated in a vacuum, the residue is shaken with ether and the portion insoluble in ether is dissolved in chloroform. The chloroform solution is washed with little water and evaporated. From the residue there is obtained $\Delta^4,\Delta^6$-pregnadiene-dione-(3,20) in the form of crystals of melting point 141° C. by distillation in a high vacuum.

What I claim is:

1. $\Delta^4,\Delta^6$-androstadiene-dione-(3,17) of the formula

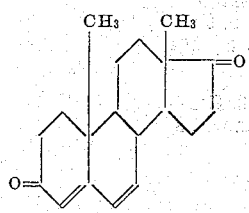

2. The compounds of the formula

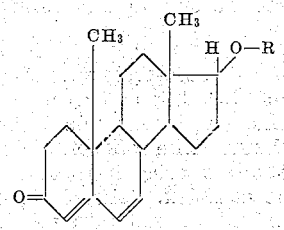

wherein R stands for a member of the group consisting of hydrogen and acyl.

3. A process of preparing $\Delta^{4,5\,:\,6,7}$-3-keto-10,13-dimethyl cyclopentanopolyhydrophenanthrene compounds comprising treating a $\Delta^{4,5}$-3-keto-6-halogeno - 10,13 - dimethyl - cyclopentanopolyhydrophenanthrene compound with an agent capable of splitting off the elements of hydrogen bromide, and recovering the $\Delta^{4,5\,:\,6,7}$-compound so formed.

4. $\Delta^{4,5\,:\,6,7}$-3-keto-10,13-dimethyl cyclopentanopolyhydrophenanthrene compounds.

5. $\Delta^{4,5\,:\,6,7}$-3-keto compounds of the androstane series.

6. $\Delta^{4,5\,:\,6,7}$-3-keto-10,13-dimethyl-17-X-cyclopentanopolyhydrophenanthrene compounds wherein X is a member of the group consisting of =O, and

R being a group convertible into hydroxyl with the aid of hydrolysis.

7. Process for the production of $\Delta^{4,5\,:\,6,7}$-3-keto-10,13 - dimethyl cyclopentanopolyhydrophenanthrene compounds which comprises reacting a $\Delta^{4,5}$-3-keto-6-halogeno-10,13-dimethyl cyclopentanopolyhydrophenanthrene compound with pyridine, and recovering the $\Delta^{4,5\,:\,6,7}$-compound so formed.

LEOPOLD RUZICKA.